April 4, 1967   U. H. KOCH ET AL   3,312,446

VALVE WITH ROTATING TURRET CONNECTION

Filed Oct. 12, 1964

INVENTORS.
ULRICH H. KOCH &
BY GARY A. SODERLUND

Fay & Fay

ATTORNEYS

United States Patent Office 3,312,446
Patented Apr. 4, 1967

3,312,446
VALVE WITH ROTATING TURRET CONNECTION
Ulrich H. Koch, Pinole, and Gary A. Soderlund, Richmond, Calif., assignors to Whitey Research Tool Co., Emeryville, Calif., a corporation of California
Filed Oct. 12, 1964, Ser. No. 403,078
7 Claims. (Cl. 251—61)

This application relates to valves, and more particularly to air-operated, diaphragm valves.

Air-operated valves have been known and used for many years. In principle, air is allowed to act on a deflectable member which is connected to a blocking or valving means, as, for example, a stem or poppet. As the deflectable member is actuated, as, for example, by pressurized air, the valving means moves accordingly and opens or closes the main through passage in the valve. When the deflecting force is removed, a spring returns the valving means to its original position.

These air-operated valves are designed to carry a diversity of fluids ranging from liquids to gases. It is, however, essential that the system fluid being transported through the valve be prevented from mixing with the operating air. By principles of this invention, a valve is provided which affords venting means strategically located such that in the event of failure in the system, mixture of the system fluid and the operating air will not occur.

Another problem which the prior art air-operated valves have incurred has been that it is often difficult to connect the valve to its supply of operating pressurized air. This is particularly true in instrumentation set-ups where various locations of valves are required, depending upon the particular application or experimental project being undertaken. In such circumstances, it is often difficult to align the conduit supplying the pressurized air with the air inlet on the valve. Frequently, additional fittings and bends in the conduit are required to make it possible to connect the air line to the valve, thus requiring more expense in the set-up, as well as additional time incurred in making the installation. By the principles of this invention, such difficulties are substantially eliminated.

It is an object of this invention to provide an air-operated valve that is either normally open or normally closed.

Another object of this invention is to provide a valve which includes in the design thereof means for venting any leakage of the operating air or the system fluid.

Still a further object of this invention is to provide a valve with a rotating turret connection for the air inlet.

A more specific object of this invention is to provide a valve with a rotating turret connection that can be rotated through 360 degrees to accommodate diverse orientations of the air supply conduit.

Still a further object of this invention is to provide a valve with a rotating, adjustable turret that need not be unlocked or locked in any position, but will remain in the position in which it is set.

Another object of this invention is to provide a valve with a rotating, adjustable turret that is self-sealing and will prevent leakage of operating pressure air, regardless of the rotary position to which the turret is adjusted and set.

To the accomplishment of the foregoing and related ends and objects, the following description sets forth in detail one approved means of carrying out the invention. Such disclosed means are not meant to be limiting inasmuch as it constitutes but one of the various ways in which the principles of the invention may be applied.

In the drawings, wherein like reference numerals indicate like parts in the various views.

Figure 1:
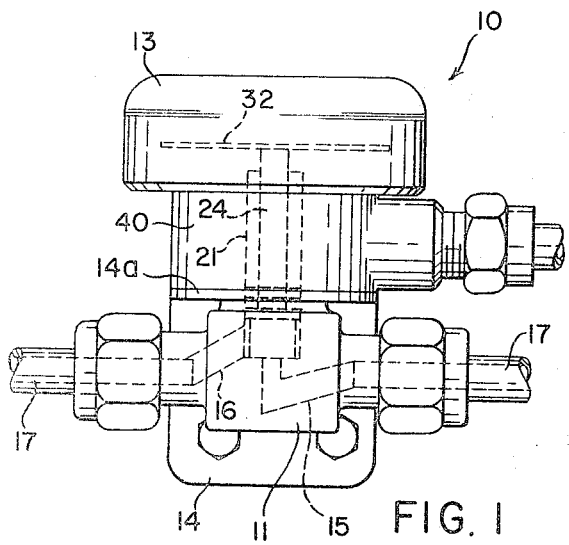
FIG. 1 is a side elevation view of the assembled valve constituting the present invention.
Figure 2:
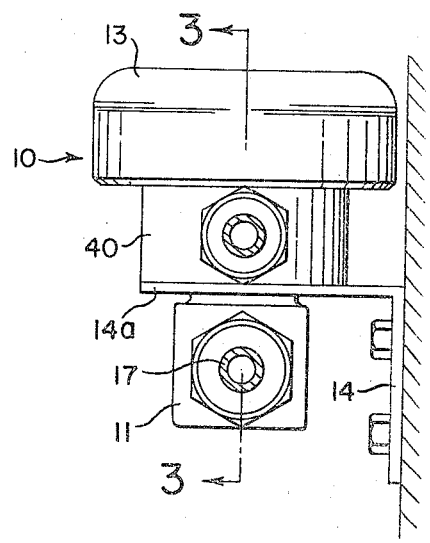
FIG. 2 is an end elevation view showing the valve mounted to a supporting member.

Referring to the drawings, and more particularly to FIG. 1, there is illustrated a valve indicated generally by the reference numeral 10, which comprises the preferred embodiment of this invention. The valve 10 comprises three major component parts, namely, the body 11, the bonnet 12 and the cap 13. In addition, a bracket 14 is designed to be associated with the valve and provide mounting means, as shown in FIG. 2, for the valve.

Figure 3:
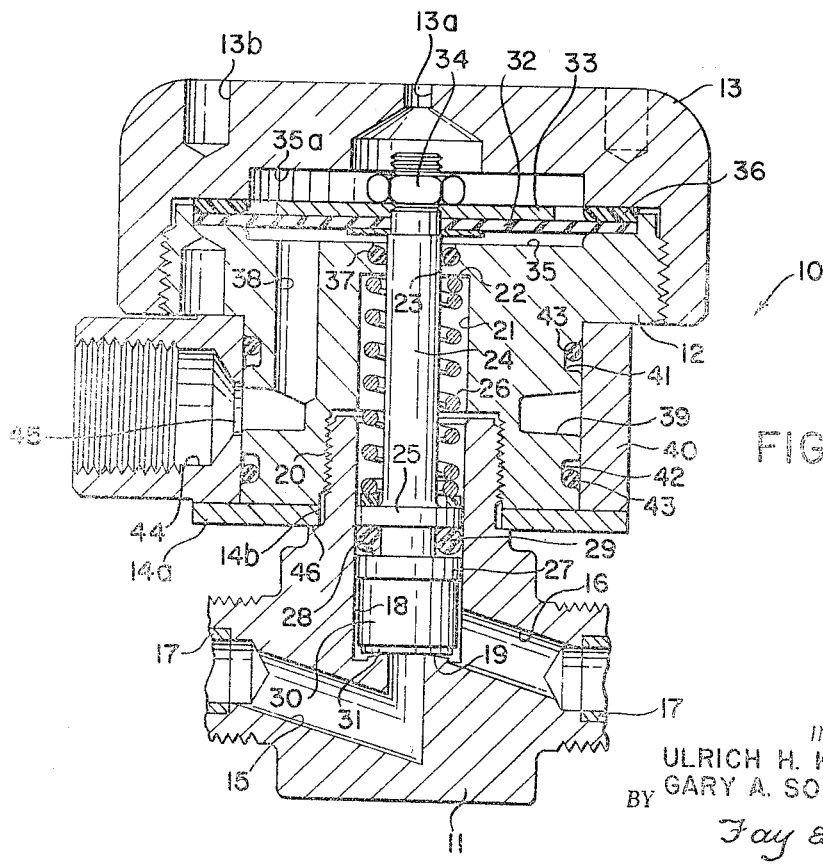
FIG. 3 is a section view taken along line 3—3 of FIG. 2.

Turning to FIG. 3, the body 11 includes inlet and outlet ports or passages 15 and 16, respectively. These passages are adapted to be connected by appropriate fittings to the fluid lines 17. A valve chamber 18 interconnects the inlet and outlet passages and includes a valve seat 19. The valve chamber 18 opens upwardly from the body 11 with the bonnet 12 being threaded at 20 to the valve body. A central bore 21 in the bonnet 12 is coextensive with the valve chamber 18 and terminates in an end wall 22.

An aperture 23 in the end wall 22 coaxial with the bore 21 opens upwardly through the bonnet 12. A stem 24 passes through the aperture 23 and is disposed in the bore 21 and the valve chamber 18. The stem 24 includes a radially extending flange 25 intermediate its ends with the flange supporting a nylon washer which serves as an abutment for one end of a coil spring 26 surrounding the stem 24. The other end of the spring abuts the end wall 22 of the bore 21, thereby biasing the stem 24 toward the valve seat 19. A second flange 27 is spaced from the flange 25, but of a radial dimension substantially equal to that of the first flange with the two flanges 25, 27 providing means forming a groove 28 in the stem 24. The groove 28 defined by the flanges 25, 27 is adapted to receive an O-ring 29, which sealingly engages the side walls of the valve chamber 18. In addition, the flanges 25, 27 are dimensioned to closely mate with the wall of the valve chamber and thereby provide guide means for the stem during its movements.

The stem 24 carries, at its lower end, a valving member 30 which includes a tip portion 31 adapted to engage the valve seat 19. The tip is ordinarily formed of Teflon and is adapted to seal against the seat 19 which is formed, as shown in FIG. 3, with a beveled surface, so that the inside diameter of the orifice is at the highest point defined by the seat with the remaining surface of the seat sloping away therefrom.

It is believed apparent from the structure recited that the spring 26 biases the stem 24 to a position wherein the tip 31 on the valving member 30 engages the seat 19, thereby preventing the flow of fluid through the valve. To reciprocate the stem 24 against the bias of the spring 26, there is attached at the end of the stem opposite to the valve seat a deflectable member which is in the form of a diaphragm 32. The diaphragm is secured to the stem at its central portion with a diaphragm support 33 interposed between the diaphragm and a lock nut 34 on the threaded end of the stem.

A recessed portion 35 defines an operating chamber in the bonnet member 12. A similar recessed portion 35a is provided in the cap 13 with a vent 13a in the cap assuring atmospheric pressure in this latter chamber. The diaphragm 32 encloses the operating chamber 35 with the diaphragm being clamped to the bonnet in covering position by the cap 13. A retaining ring 36 is associated with the cap 13 to clamp the diaphragm around its outer peripheral margins to the bonnet. A pair of bores 13b are provided in cap 13 whereby a spanner wrench or similar tool may be used to thread the cap on the bonnet 12.

An O-ring 37 surrounds the stem 24, thus providing means sealing the operating chamber 35 from the bore 21 and the valve chamber 18. The O-ring is disposed in a recess having curved sides conforming to the outline of the O-ring and retaining the O-ring securely in position. Communicating with the operating chamber 35 is a passageway 38 formed in the bonnet 12 and extending substantially parallel to the bore 21. The passageway 38 connects with a groove 39 which encircles the mid portion of the bonnet 12.

Encircling the bonnet 12 and overlying the groove 39 is a cylindrical turret member 40 with the mating surfaces of the turret and the bonnet being machined to provide a close, yet non-interferring, fit whereby the turret 40 may be revolved relative to the bonnet 12. Grooves 41, 42 are disposed on opposite sides of the groove 39 with O-rings 43 being received therein to provide sealing means for the groove 39. The turret 40 includes a radially extending opening 44 including a mouth portion 45 of a dimension substantially equal to the dimension of the groove 39 and being in communication therewith. The opening 44 is adapted, by threads or other appropriate means, to be connected to a source of pressurized air for actuation of the valve. It is believed apparent that any air introduced through the opening 44 will be transmitted through the groove 39 and the passage 38 to the operating chamber 35.

Adapted to be formed as an integral part of the valve assembly is the mounting bracket 14. The bracket is dimensioned such that it provides a coextension of the mating parts of the valve, with the supporting arm 14a of the bracket having an aperture 14b receiving the threaded portion of the body 11 and resting on a shoulder 46 formed on the body 11. With the bonnet threaded on to the body, it is believed apparent that the bracket is clamped between the bonnet and the shoulder 46 on the body thereby providing a rigid interconnection. The bracket 14 also provides a supporting surface for the rotatable turret 40 thereby maintaining the turret in position covering the groove 39.

Several features of the valve above-described are to be noted. Thus, through the provision of the rotatable turret 40, it is believed apparent that, with the valve assembled as shown in FIG. 2, the orientation of the operating line which is to be connected to the opening 44 is not critical. If the conduit is not in alignment with the opening 44 it is but a simple matter to revolve the turret 40 until such alignment is obtained whereupon the conduit may be attached to the valve for operating the same. In addition, it is to be noted that the threaded connection 20 between the bonnet 12 and the body 11 provides a means whereby any leakage from the valve chamber 18 or the operating chamber 35 would be dissipated through the threads without intermixture of the two fluids. Another feature is the provision of an O-ring at the lower end of the stem 24 which O-ring is interposed between two guiding flanges 25, 27. This O-ring relationship provides a means whereby only the valving member 30 need be exposed to the process fluid as opposed to exposing the valve stem and associated parts to such fluid. Moreover, the flanges 25, 27, being provided as they are at the lower end of the stem adjacent the seat, assures proper alignment of the stem with the valve seat 19.

Operation of the valve occurs upon introduction of pressurized air through the inlet opening 44. Irrespective of the alignment of the inlet opening, the air is channeled through the mouth 45 into groove 39 and thence through the passage 38 into the operating chamber 35. The pressurized air in the chamber 35 causes a deflection of the diaphragm 32 which lifts the stem associated therewith such that the tip 31 on the valving member 30 is displaced from the seat 19. With the seat 19 exposed, fluid is permitted to flow through the inlet passage 15 and out of the valve through the outlet passage 16. Upon relief of the pressure in the operating chamber 35, the spring 26 will return the stem to its normally closed position so that the tip 31 is in sealing engagement with the seat 19 thereby preventing any further flow of fluid through the valve.

Modifications and changes will suggest themselves to those having ordinary skill in the art. However, changes such as these are contemplated by the principles of this invention so that, although for ease of description the principles of the invention have been set forth in connection with but a single illustrated embodiment, it is not intended that these illustrated embodiments or the terminology employed in describing them is to be limiting, but rather, it is my desire to be restricted only by the scope of the appended claims.

I claim:

1. A valve comprising a body having inlet and outlet ports formed therein;
    a valve chamber in said body interconnecting said ports and including a sealing seat;
    a bonnet secured to said body;
    stem means extending through said bonnet into said valve chamber;
    one end of said stem means extending upward beyond said bonnet;
    a flexible diaphragm member secured to said one end of said stem means;
    a cap enclosing said diaphragm and clamping the marginal portions of said diaphragm to said bonnet;
    a recess formed in said bonnet beneath said diaphragm defining an operating chamber;
    spring means associated with said stem means and biasing said stem means toward one end position;
    passage means in said bonnet communicating with said operating chamber;
    adjustable inlet means carried by said bonnet communicating with said passage means whereby a source of pressurized fluid introduced through said inlet means causes deflection of said diaphragm;
    said adjustable inlet means being movable to a plurality of positions circumferentially of said bonnet means.

2. The valve of claim 1 wherein said adjustable inlet means comprises a ring rotatably encircling said bonnet and said passage means includes a circumferential groove in said bonnet covered by said ring; an aperture in said ring in communication with said groove.

3. A valve comprising body means having inlet and outlet ports formed therein;
    a valve chamber interconnecting said ports and including a sealing seat;
    flow controlling means including stem means in said valve chamber adapted to engage said sealing seat at one end thereof and thereby control the flow through said valve;
    a flexible diaphragm member carried by said body means secured to the other end of said stem means;
    an operating chamber defined by said body means adjacent to said diaphragm;
    passage means in said body means communicating with said operating chamber whereby fluid pressure introduced in said passage means causes deflection of said diaphragm member thereby moving said flow controlling means; and
    a circumferentially rotatable turret carried by said body means rotatable to a plurality of positions relative to said body means;
    said rotatable turret including an aperture in fluid tight communication with said passage means throughout the range of rotation of said turret.

4. A valve comprising body means with a flow passage therethrough;

flow controlling means in said body means operable to control the flow of fluid therethrough;
diaphragm means attached to said flow controlling means;
said diaphragm means being deflectable in the presence of fluid pressure whereby deflection of said diaphragm means causes a corresponding movement of said flow control means thereby to vary the flow of fluid through said body means;
fluid passage means in said body means communicating with said diaphragm means; and
adjustable inlet means for said fluid passage; and
means supporting said inlet means on said body means for movement relative to said body means while in fluid tight relation with said passage.

5. The valve of claim 1 wherein said spring means encircles said stem means; and
seal means on said stem means intermediate said spring means and said ports whereby said spring means is isolated from the system fluid.

6. The valve of claim 5 and further including seal means encircling said stem means adjacent said one end of said stem means and cooperating with the bonnet to isolate said spring means from said operating chamber.

7. The combination of claim 4 wherein said inlet means comprises a ring rotatably encircling said bonnet; an aperture extending radially through said ring;
said passage means including a circumferential groove in said body means with said ring overlying said groove and said aperture being in fluid communication with said groove.

References Cited by the Examiner
UNITED STATES PATENTS

| | | | |
|---|---|---|---|
| 3,007,485 | 11/1961 | Barker | 137—615 X |
| 3,092,070 | 6/1963 | Wright | 251—61 X |
| 3,143,143 | 8/1964 | Taylor | 251—62 X |

M. CARY NELSON, *Primary Examiner.*

ARNOLD ROSENTHAL, *Examiner.*